(12) United States Patent
Bos

(10) Patent No.: US 7,422,409 B2
(45) Date of Patent: Sep. 9, 2008

(54) DEVICE FOR GRIPPING AND DISPLACING MATERIAL, SUCH AS ROUGHAGE

(75) Inventor: Greorgius Rudolphius Bos, Bolsward (NL)

(73) Assignee: Lely Enterprises Ag, Zug (CH)

( * ) Notice: Subject to any disclaimer, the term of this patent is extended or adjusted under 35 U.S.C. 154(b) by 350 days.

(21) Appl. No.: 10/940,755

(22) Filed: Sep. 15, 2004

(65) Prior Publication Data

US 2005/0063812 A1 Mar. 24, 2005

(30) Foreign Application Priority Data

Sep. 19, 2003 (NL) .................................. 1024326

(51) Int. Cl.
*B66C 3/02* (2006.01)
(52) U.S. Cl. .................... 414/624; 414/626; 294/108
(58) Field of Classification Search ............... 414/624, 414/736, 731, 13, 626; 294/108; 198/704
See application file for complete search history.

(56) References Cited

U.S. PATENT DOCUMENTS

| | | | | |
|---|---|---|---|---|
| 1,113,738 | A * | 10/1914 | Beane | 414/379 |
| 1,238,184 | A * | 8/1917 | Norris | 414/624 |
| 3,529,735 | A * | 9/1970 | Wehde | 414/739 |
| 3,762,586 | A * | 10/1973 | Updike, Jr. | 414/408 |
| 3,807,589 | A * | 4/1974 | Shovick | 414/740 |
| 3,817,567 | A * | 6/1974 | Lull | 294/88 |
| 4,036,365 | A * | 7/1977 | Rosenfeld | 209/3.1 |
| 4,565,485 | A * | 1/1986 | Wilman | 414/704 |
| 4,911,491 | A * | 3/1990 | Naaktgeboren | 294/105 |
| 5,257,887 | A * | 11/1993 | Kregl | 414/411 |
| 5,346,052 | A | 9/1994 | Fox | |
| 5,664,348 | A * | 9/1997 | Omann | 37/405 |
| 5,829,940 | A * | 11/1998 | Mahaney | 414/111 |
| 5,960,570 | A * | 10/1999 | Satzler | 37/337 |
| 6,213,706 | B1 * | 4/2001 | Christenson | 414/408 |
| 6,655,890 | B1 * | 12/2003 | Weir | 414/13 |

FOREIGN PATENT DOCUMENTS

| | | |
|---|---|---|
| DE | 404 626 | 6/1923 |
| DE | 28 11 281 A1 | 3/1978 |
| DE | 39 21 871 A1 | 7/1989 |
| FR | 2 540 087 A1 | 2/1983 |
| GB | 708 981 | 3/1951 |
| JP | 2002187688 | 12/2000 |

OTHER PUBLICATIONS

Search Report Issued by Dutch Patent Office.

* cited by examiner

*Primary Examiner*—James Keenan
(74) *Attorney, Agent, or Firm*—David P. Owen; Jacobus C. Rasser; Howrey LLP

(57) ABSTRACT

A device for gripping and displacing material, such as roughage for animals, which device is provided with a gripper (2) for gripping and subsequently displacing the material, and with a collecting device (5) comprising a collecting element (6) for collecting material falling unintentionally from the gripper (2). The device is further provided with an operating element (7) such that, after the material has been gripped by the gripper (2), the collecting element (6) is capable of being brought from an inactive position into a further position in which the collecting element (6) is able to collect material that is lost unintentionally by the gripper (2).

23 Claims, 3 Drawing Sheets

DEVICE FOR GRIPPING AND DISPLACING MATERIAL, SUCH AS ROUGHAGE

CROSS REFERENCE TO RELATED APPLICATIONS

This application claims priority from Netherlands application number 1024326 filed on 19 Sep. 2004, the contents of which are hereby incorporated by reference in their entirety.

BACKGROUND OF THE INVENTION

1. Field of the Invention

The invention relates generally to a device for gripping and displacing material, such as roughage for animals, in particular to such a device provided with a gripper for use in combination with a feeding column for distributing feed to a number of animals.

2. Description of the Related Art

Devices are known for gripping and displacing material. Such devices may comprise a pair of articulated grabs suspended from a gantry or the like. Different forms of grab e.g. buckets, forks, clamps etc may be used according to the type of material to be displaced. Gripping devices are also known in which a first fork-gripper is surrounded by a double bucket-gripper. By means of the fork-gripper large pieces of material are gripped, whereas by means of the bucket-gripper it is possible also to grip smaller parts of material. Material parts falling from the fork-gripper may be collected by the bucket-gripper. However, if the bucket-gripper is not completely closed, for example owing to material parts being clamped between the two bucket halves, the risk of material parts falling unintentionally from the gripping device during transport or during lifting of the gripper always remains. A device of this type is known from Japanese Patent Publication JP 2002/187688 in which a fork-gripper and bucket-gripper move as a single piece between spread and grasp positions.

Unintentional spillage from a grab is particularly inconvenient where the grab must pass over areas where it is not desired that material should fall. This is particularly the case in automated environments where operators may not be available to tidy up. Material falling over or into machinery may also form a hazard for continued operation of the machinery. Thus, there is a particular need for a gripping device providing improved cleanliness in the transport area.

BRIEF SUMMARY OF THE INVENTION

The present invention addresses these problems by providing a device for gripping and displacing material comprising: a gripper for gripping and subsequently displacing the material; a collecting device comprising a collecting element for collecting material falling unintentionally from the gripper; an actuator for actuating the gripper from an open position to a gripping position; and an operating element for independently moving the collecting element between an inactive position in which the gripper may be actuated to grip material and an active position in which the collecting element is able to collect material that is lost unintentionally by the gripper. In this context, independent movement of the collecting element is understood to encompass all movement thereof that is not concurrent with movement of the gripper between open and gripping positions. Thus, the movement of the collecting element may take place as a consequence of e.g. the completion of movement of the gripper. Similarly, interlocks may be provided to prevent movement of the collecting element unless the gripper is in a particular position.

According to an advantageous feature of the invention, in the inactive position, the collecting element is located to the side of the gripper. In this manner the gripper is not impeded by the collecting element during gripping the material. Preferably, the collecting element is located at the same level as or above the lower side of the gripper. In a particular embodiment of the invention, the collecting element may be located in its inactive position at a higher level than the upper side of the gripper. Preferably, the gripper may be movable in height between a lower position for gripping material and an upper position. In this case, the collecting element may be located adjacent to the upper position of the gripper and may be movable to the active position only after the gripper has been moved to the upper position.

According to another embodiment, the gripper comprises gripping surfaces and the collecting element in its active position is generally located beneath the gripping surfaces. These gripping surfaces may be the opposing surfaces of a bucket or fork gripper, between which the material is gripped.

According to a yet further embodiment, the collecting element may be designed as a single receptacle. This single receptacle, in the inactive position, may be located to one side only of the gripper and may be moved to the active position in which it lies beneath substantially the complete gripper. The single receptacle may be considered as a non-gripping element.

In order to enable the material collected by the collecting element to leave the collecting element in a simple manner during emptying the gripper, there may be provided, preferably along one edge of the collecting element, an outlet via which the material collected can leave the collecting element. In particular, the collecting device may be mounted to rotate about a horizontal pivot axis. In moving from the active position to the inactive position, the collecting element may pivot in a direction away from the outlet such that the outlet becomes the lowest point of the collecting element and collected material may fall out.

In order to grip the material to be gripped as uniformly as possible from the storage place and/or to drop it as uniformly as possible at the destination, the device may preferably comprises a level sensor with the aid of which the distribution and/or the level and/or the difference in level of the material to be gripped and/or of the material already dropped may be determined. The level sensor may be disposed on the device for movement therewith and/or one or more level sensors may be arranged next to the material to be gripped and/or at the place where the material is dropped.

According to a further inventive feature, a controller may be provided for controlling operation of some or all elements of the device. In particular, the controller may control operation of one or more of the following non-exhaustive list of actions: actuation of the gripper; operating the collecting element between active and inactive positions; raising and lowering of the gripper; and laterally displacing the gripper. The controller may comprise a microprocessor or the like. The controller may control operation of the device automatically by means of the signals emitted by the aforementioned level sensor or by other sensors such as proximity sensors, material-determining sensors or content-determining devices as described below. In this manner the device is capable of working fully autonomously, without the supervision of an operator.

According to a yet further inventive feature, operation may take place using e.g. the signal from the level sensor in such a way that, if the material to be gripped is located at different levels, the material located at the highest or almost the highest level will always be the first to be gripped. Additionally or alternatively, the material may be dropped at that place where the level of the material dropped is the lowest or almost the lowest. In this way a sensible distribution of material is maintained.

According to again another inventive feature, the gripper may be connected to a suspension device. The suspension device is preferably displaceable e.g. along a rail or by mounting thereof on an autonomous vehicle. The latter embodiment has the advantage that the material can be displaced via a freely determinable route.

In a favourable embodiment of the device, the device comprises an accordion-like hingeable arm construction which is connected at one end to the suspension device and at the other end to the gripper. The accordion-like hingeable arm construction can be used actively to move the gripper in vertical direction by means of e.g. appropriate actuator elements. It is also possible to design said construction only as a guide one, so that it has only a stabilising function. The construction may then impede movement of the gripper with respect to the suspension device in a horizontal plane.

In another embodiment according to the invention, the gripper may be movable in height relative to the suspension device by means of a hoist. Such a hoist may operate in combination with a guide e.g. an accordion-like hingeable arm construction.

In a preferred embodiment according to the invention, the collecting device may be disposed on the suspension device e.g. for rotatation about a horizontal pivot axis. Locating the collecting device on the suspension device rather than on the gripper is particularly advantageous when the collecting element is not symmetrical. If a collecting element were located on one side of the gripper it could apply undesired forces thereto.

The device may form part of a feeding installation comprising a feeding column provided with one or more feed troughs and with a chute hopper for dropping the material gripped by the gripper. The feeding column may be provided with a metering mechanism for metering, from the chute hopper, the material to be supplied to the feed trough(s). The installation may further be provided with a content-determining device for determining the weight and/or the volume of the material present in the feeding column. It is further advantageous if the installation comprises an alarm device and/or a make-and-break device that emits a signal if there is little or no material left to be gripped by the gripper. In this manner it is possible that the device is put out of operation temporarily and/or that the attention of an operator is drawn to the fact that there is no material left to be picked up by the device. There may also be provided weighing means with the aid of which the amount of material gripped and/or dropped is determined.

According to further inventive features, the device may comprise a material-determining sensor, such as a camera with picture-analysing equipment and/or an odour sensor, with the aid of which it may be determined what sort of material is present to be gripped and/or what material has been gripped. With the aid of the material-determining sensor it is thus possible, if different sorts of material are present to be gripped, to make a choice from the material sorts. By sort of material is also meant material of a particular quality. With the aid of said material-determining sensor it is thus possible to distinguish between materials of different quality or even materials that are no longer suitable at all for being gripped and displaced.

According to a still further advantageous embodiment of the invention, the device may be provided with protective devices for protecting human beings and/or animals against coming unintentionally into contact with and/or being injured by the device during operation. Such protective devices may comprise e.g. a proximity sensor that emits a signal when a human being and/or an animal comes within a particular distance from a part of the device. By such sensors are also meant sensors that are capable of detecting a contact. Possible sensors for this purpose are infrared sensors, a camera or contact sensors.

The invention also provides a method of gripping and displacing material using a gripper for gripping the material and a collecting element for collecting material falling from the gripper, the method comprising: actuating the gripper to grip a portion of material; raising the gripper together with the portion of material; operating the collecting element to a position below the gripper; and displacing the gripper and collecting element together, such that material falling from the gripper during the displacement is received by the collecting element. The gripper and collecting element may subsequently be displaced to a destination position and the collecting element operated to release material received thereby. The gripper may then be actuated to release the remaining portion of material.

BRIEF DESCRIPTION OF THE DRAWINGS

The features and advantages of an exemplary embodiment of the invention will now be explained in further detail with reference to the accompanying drawings, in which:

FIG. 2 shows the gripper according to FIG. 1 when gripping the material to be displaced with the receptacle in both the active and inactive positions, and.

DESCRIPTION OF ILLUSTRATIVE EMBODIMENTS

Figure 1:
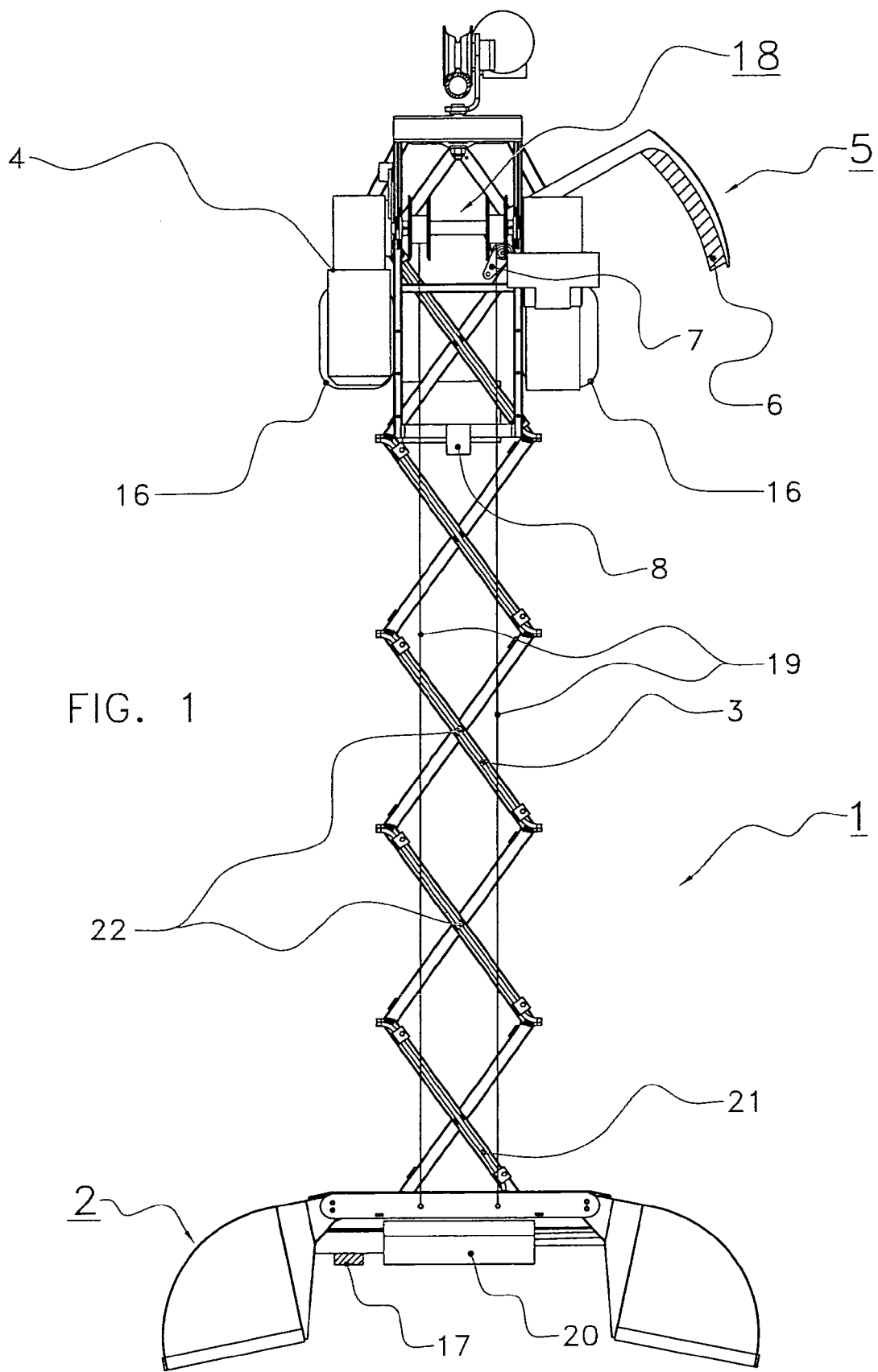
FIG. 1 is a side view of a device according to the invention, which is provided with a collecting device comprising a collecting element for collecting material falling unintentionally from the gripper.

FIG. 1 is a side view of a gripping device 1 for gripping and displacing material, such as roughage for animals for example, which device is provided with a gripper 2 designed in the present embodiment as a bucket-gripper. However, it will be obvious that, instead of a bucket-gripper, it will also be possible to apply other suitable gripping elements, such as a fork-gripper for example; the choice of the gripping elements largely depends on the material to be gripped. The gripper 2 is connected to a displaceable suspension device 4 by means of an accordion-like hingeable arm construction 3.

The accordion-like hingeable arm construction 3 serves to stabilise the gripper 2 in its extended position. Sideward movements of the gripper 2 are limited by means of such a construction. For this purpose, the separate hingeable arms are connected in their middle, in a way in which they are rotatable relative to one another, about pivot axes 22.

The gripping device 1 is further provide with a collecting device 5 comprising a collecting element 6 for collecting material falling unintentionally from the gripper 2. The gripping device 1 is also provided with an operating element 7 by means of which, after the material has been gripped by means of the gripper 2, the collecting element 6 is capable of being brought from an inactive position, shown in FIG. 1, into a further active position in which the collecting element 6 is able to collect material that is lost unintentionally by the gripper 2. The operating element 7 may be any appropriate form of actuation device including but not limited to hydraulic and pneumatic actuators, solenoids, motors and mechanical linkages. In the present embodiment, the active position of the collecting element 6 is at a position, below the lowermost surface of the gripper 2 after retraction thereof as far as the displaceable suspension device 4 by means of the accordion-like hingeable arm construction 3. In the embodiment shown, the collecting element 6 is designed as a receptacle which is preferably provided on one side with an outlet via which the collected material can leave the collecting element 6. This may be achieved by pivoting the collecting element from the active position to one side or the other. While the collecting element 6 is shown to be pivotally attached to the suspension device 4, it is noted that other ways of mounting the collecting element may also be used. The collecting element may thus be mounted directly or indirectly on the gripping device or may be mounted independently of both the gripping device and suspension device.

Figure 2:
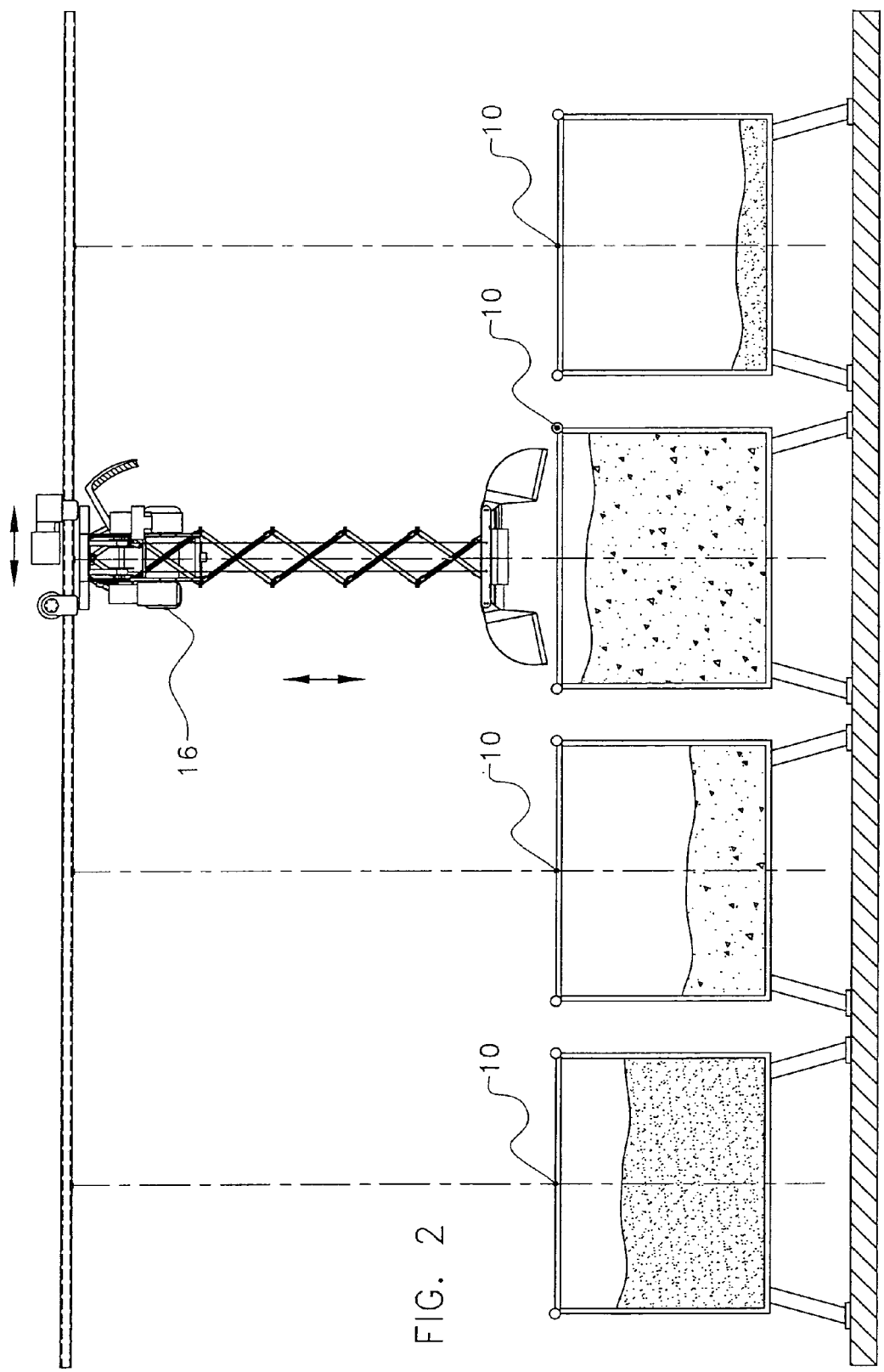
Figure 3:
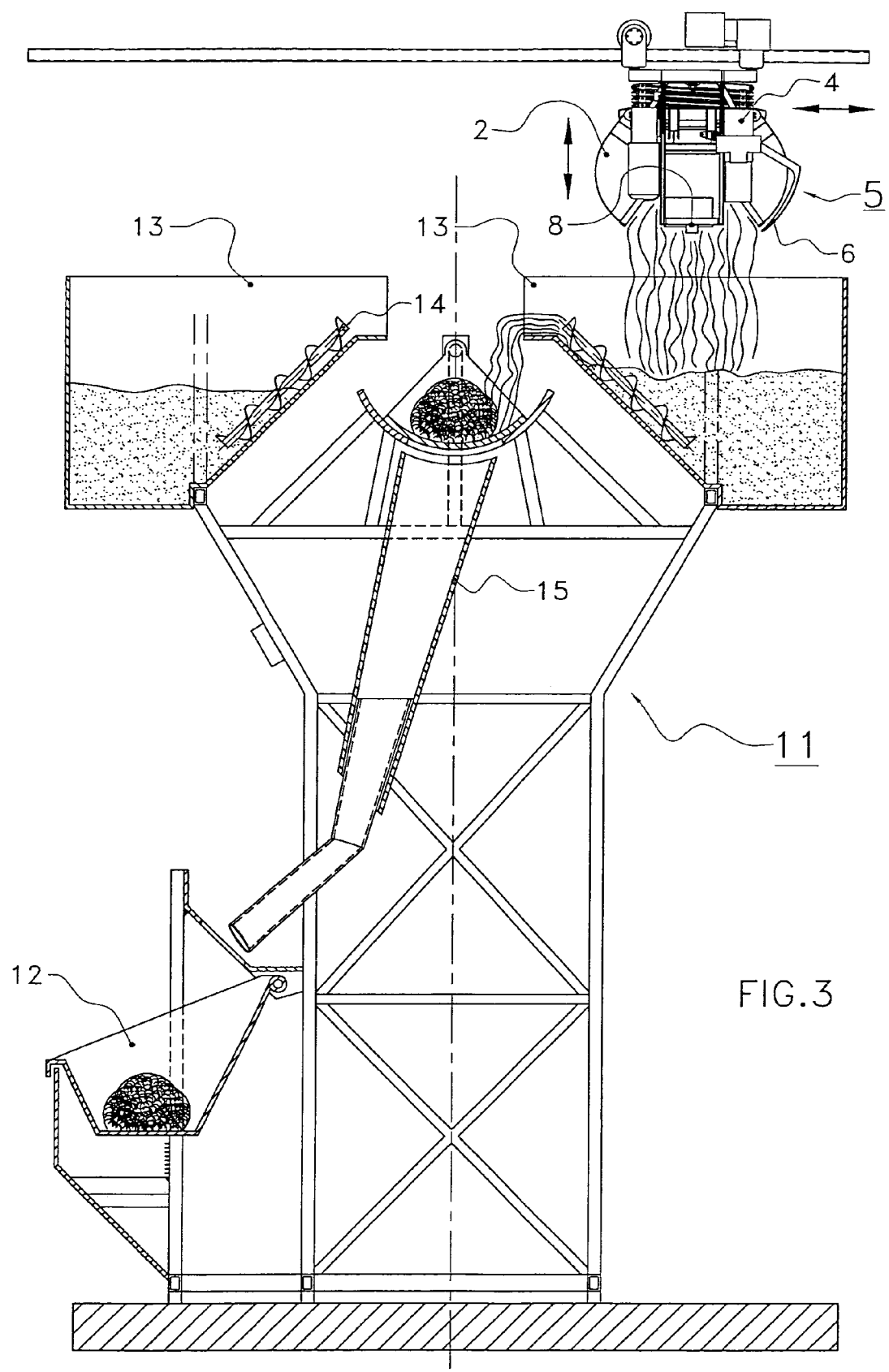
FIG. 3 shows the gripper according to FIGS. 1 and 2 in co-operation with a feeding column that is provided with one or more feed troughs and a chute hopper for dropping the material gripped by the gripper.

The gripping device is generally provided with a controller (not shown) by which its operation is controlled. The controller can receive signals from a number of sensors and can control operation of some or all of the operations of the gripping device and related elements. The controller may be located either locally or remotely. As shown in FIGS. 1-3, the gripping device 1 comprises a sensor 8 with the aid of which the distribution and/or the level and/or the difference in level of the material to be gripped and/or of the material already dropped may be determined. The sensor 8 emits signals to the controller for the gripping device 1, in such a way that the device is actuated fully automatically without the intervention of an operator.

The gripper 2 is movable in height relative to the suspension device 4 by means of a hoist 18. Said hoist 18 comprises two reels on which two identical cables 19 are capable of being wound. By means of said cables 19 the gripper 2 is connected to the suspension device 4. In order to open the gripper 2 there is provided a hydraulic cylinder 20 by means of which it is possible to move the two gripping elements away from each other. Via a hydraulic line 21 the cylinder 20 is connected to a non-shown hydraulic pump that is disposed on the suspension device 4. The hydraulic line 21 is suspended from the accordion-like hingeable arm construction 3. Other forms of actuation device may alternatively be provided.

In a non-shown embodiment, the vertical movement of the gripper 2 takes place actively in a known manner by means of the accordion-like hingeable arm construction 3. In such case the hoist 18 is not required and the separate hingeable arms of the may be provided with individual actuators.

As shown in FIG. 2, the displaceable suspension device 4 moves along a rail 9 that is suspended above several feed bins 10. The feed bins 10 may contain different sorts of material that are gripped from the feed bins 10 by means of the gripper 2 and are moved via the rail 9 to the feeding column 11 shown in FIG. 3. The feeding column 11 comprises feed troughs 12 from which the animals are able to eat. The feeding column 11 is further provided with chute hoppers 13 for dropping the material gripped by the gripper 2. Each of the chute hoppers 13 is provided with a metering mechanism comprising a loading auger 14. By means of the loading auger 14 material can be dropped from the chute hoppers 13 via a chute 15 into the several feed troughs 12. If material is lost by the gripper 2 during transport of the gripping device 1, this material is collected by the collecting element 6 and is the first to be dropped into the chute hopper 13 by bringing the collecting element 6 into the inactive position, after which the remaining material is subsequently dropped into the chute hopper 13 by opening the gripper 2.

As shown in FIG. 1, the gripping device 1 further comprises protective devices 16 that protect human beings and/or animals against coming into contact in a undesirably violent manner with the displaceable suspension device 4. The protecting devices 16 are designed in such a way that, when an animal and/or a human being comes into contact with the gripping device 1, the latter is immediately put out of operation and, optionally, a warning is sent to a supervisor. The gripping device 1 is further provided with (non-shown) a weight sensor, with the aid of which the amount of material gripped and/or dropped is determined. As shown in FIG. 1, the gripper 2 comprises a material-determining sensor 17, such as for example an odour sensor and/or a colour sensor, with the aid of which the quality of the material gripped and/or to be gripped is determined.

While the invention has been described by reference to certain embodiments discussed above. It will be recognized that these embodiments are susceptible to various modifications and alternative forms well known to those of skill in the art. For example, the accordion-like hingeable arm construction may be replaced by other equivalent constructions such as a telescopic or single hinged arm. Similarly, the suspension device may be located on an independently movable vehicle rather than on a rail construction.

Many further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for gripping and displacing material comprising:
   a gripper for gripping and subsequently displacing the material;
   a collecting device comprising a collecting element for collecting material falling unintentionally from the gripper;
   an actuator for actuating the gripper from an open position to a gripping position; and
   an operating element for independently moving the collecting element between an inactive position, in which the gripper may be actuated to grip material, and an active position in which the collecting element is able to collect material that is lost unintentionally by the gripper wherein the gripper comprises a plurality of gripping surfaces and the collecting element is a single receptacle which in the active position is located substantially centrally beneath the plurality of gripping surfaces.

2. The device as claimed in claim 1, wherein, in the inactive position, the collecting element is located to the side of the gripper.

3. The device as claimed in claim 1, wherein, in the inactive position, the collecting element is located at the same level as or above a lower side of the gripper.

4. The device as claimed in claim 1, wherein, in the inactive position, the collecting element is located at a higher level than an upper side of the gripper.

5. The device as claimed in claim 4, wherein the collecting element comprises an outlet via which the material collected can leave the collecting element on movement thereof from the active position to the inactive position.

6. The device as claimed in claim 4, wherein the gripper is connected to a displaceable suspension device.

7. The device as claimed in claim 6, further comprising a rail along which the suspension device is displaceable or in that the device is disposed on an autonomous vehicle.

8. The device as claimed in claim 6, wherein the device comprises a hingeable cross-arm construction which is connected at one end to the suspension device and at the other end to the gripper.

9. The device as claimed in claim 6, wherein the gripper is movable in height relative to the suspension device by means of a hoist between a raised position and a lowered position.

10. The device as claimed in claim 9, wherein the collecting device is disposed on the suspension device and is movable to the active position only when the gripper is in the raised position.

11. The device as claimed in claim 1, further comprising a sensor for determining the distribution or the level or the difference in level of the material to be gripped or of the material already dropped.

12. The device as claimed in claim 11, further comprising a controller for operating the device automatically by means of signals emitted by the sensor.

13. The device as claimed in claim 12, wherein the controller controls operation of the device such that, if the material to be gripped is located at different levels, the material located at a generally highest level will always be the first to be gripped or the material will be dropped at that place where the level of the material dropped is generally lowest.

14. The device as claimed in claim 1, wherein the collecting device is rotatable about a horizontal pivot axis.

15. The device as claimed in claim 1, further comprising a feeding column provided with one or more feed troughs and with a chute hopper for dropping the material gripped by the gripper.

16. The device as claimed in claim 1, further comprising a material-determining sensor for determining what sort of material is present to be gripped or has been gripped.

17. The device as claimed in claim 1, further comprising a protecting device for protecting human beings or animals from unintentional contact with or injury by the device during operation.

18. The device as claimed in claim 17, wherein the protecting device comprises a sensor that emits a signal when a human being or an animal comes within a particular distance from a part of the device.

19. The device as claimed in claim 18, further comprising a controller for controlling operation of the device and wherein the controller is responsive to the sensor signal.

20. A method of gripping and displacing material using a gripper comprising gripping surfaces for gripping the material and a collecting element consisting of a single receptacle which in an active position is generally located beneath the gripping surfaces for collecting material falling from the gripper, the method comprising:

actuating the gripper to grip a portion of material;

raising the gripper together with the portion of material;

subsequently operating the collecting element to pass below the gripping surfaces to a position below the raised gripper; and displacing the gripper and collecting element together, such that collected material falling from the gripper during the displacement is all received in the single receptacle.

21. The method as claimed in claim 20, wherein the gripper and collecting element are displaced to a destination position and the method further comprises operating the collecting element to release material received thereby and subsequently actuating the gripper to release the remaining portion of material.

22. A device for gripping and displacing material comprising:

a suspension device, generally displaceable in a horizontal direction a gripper comprising gripping surfaces for gripping the material, the gripper being supported by the suspension device for vertical movement with respect thereto; and a collecting device mounted on the suspension device for collecting material falling unintentionally from the gripper, the collecting device consisting of a single receptacle which in an active position is located substantially centrally beneath substantially the complete gripper.

23. The device according to claim 22, wherein the collecting device is mounted to the suspension device for pivotal movement to a position below the gripper.

* * * * *